W. Robinson,
Dressing Staves.
N° 19,444. Patented Feb. 23, 1858.
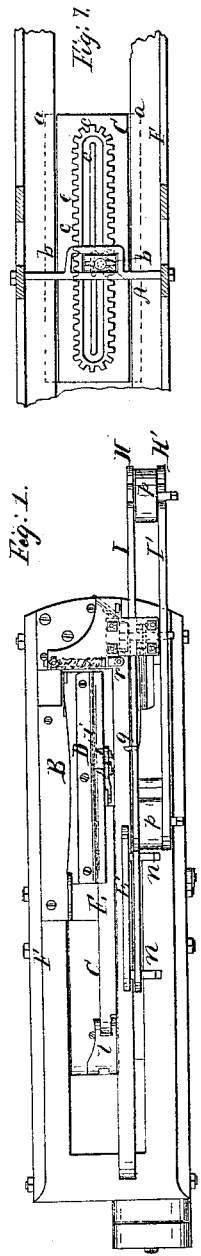
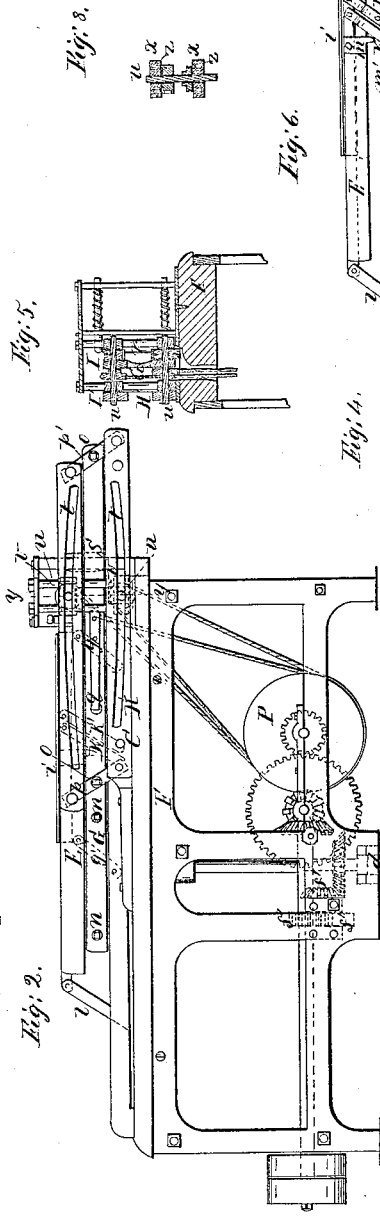
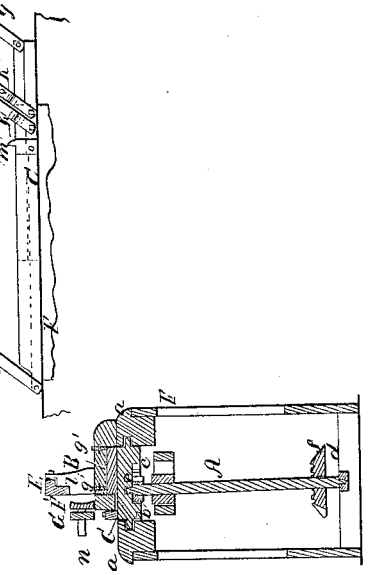
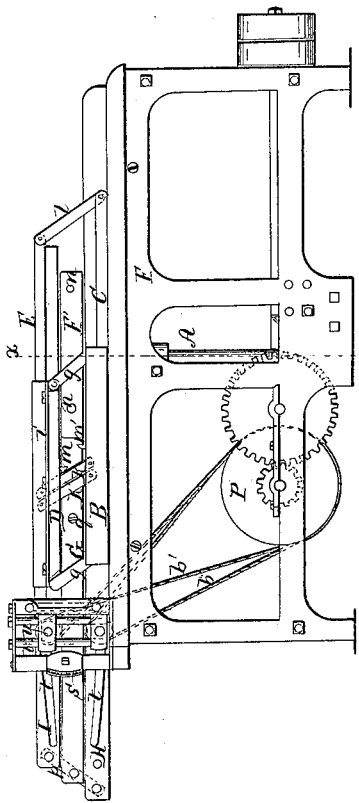

UNITED STATES PATENT OFFICE.

WM. ROBINSON, OF AUGUSTA, GEORGIA.

STAVE-MACHINE.

Specification of Letters Patent No. 19,444, dated February 23, 1858.

*To all whom it may concern:*

Be it known that I, WILLIAM ROBINSON, of Augusta, in the county of Richmond and State of Georgia, have invented a new and useful Improvement in Stave-Machines; and I do hereby declare that the following is a full, clear, and exact description of the same, reference being had to the annexed drawing, forming part of this specification, in the several figures of which similar characters of reference denote the same part.

The machine here considered is designed to cut the stave from the bolt, and deliver it properly dressed, and ready for howeling and crozing; the combination of devices for effecting this object will readily be understood from the following description and reference to the drawing, in which—

Figure 1 is a top view of the machine. Fig. 2 is a rear elevation of the same. Fig. 3 is a front elevation of the same. Fig. 4 is a vertical transverse section on line $x$—$x$. Fig. 5 is a vertical transverse section of upper portion on line $y$—$y$. Fig. 6 is a rear view of frame in which the riving and outside dressing knives are secured. Fig. 7 is a bottom view of carriage showing manner of reciprocating same. Fig. 8 is a horizontal section through axis of rotary cutter shaft, showing the manner in which the cutters are guided in their vertical movement.

The operating mechanism is supported by a strong frame F, in guides $a$ $a$ (Fig. 4) of which, reciprocates the riving and bolt dressing carriage C, by the meshing of pinion $b$ with the teeth $c$ in the bottom of the carriage. The shaft A of this pinion rests in an oscillating box $d$ so that the head of the shaft may traverse the continuous groove $e$, and cause the gearing to mesh, and move the carriage. This shaft is rotated from main shaft through gear wheels $f$ $f'$ $f''$ $f'''$.

Secured to the frame F and extending over the carriage C, is the bolt bed B, above which and connected by bars $g$ $g'$ is the securing cap piece D, which adjusts itself to the thickness of the bolt. On this cap piece is a guide $i$, under which is movable a bar E, connected with the carriage by the riving and dressing knives $k$ $k'$, and jointed bar $l$, so that this bar will conform vertically to the position assumed by the aforesaid cap piece D and move under the guide $i$ as the carriage C reciprocates. The knives $k$ $k'$ are loosely connected with the carriage and bar E, and vary in inclination with the thickness of the bolt. In front of these knives are the cutters $m$ $m'$, the one secured to the carriage and the other to bar E, the object of these cutters being to gage the thickness of the stave by two deep scores, which the riving knife will follow, and tearing of the edges be prevented.

Connected with the carriage and capable of regulation by screws $n$ is the plate F' for regulating the thickness of the stave. This adjusting plate F' is held by a longitudinal piece G having a jointed connection with a plate H secured to the carriage, by swinging bars $p$ $p'$ and bolts $o$ $o$, these latter bolts also providing a lateral adjustment for the piece G. When the carriage C is at the termination of its return movement, the bolt is laid upon its bed and forced against the plate F', cutter $m$ first encounters it, drawing cap piece D down upon the bolt, and with it bar —. The lower cutter $m'$ then enters the bolt and is followed by the riving knife $k$. The bolt is held firmly between bed B and its cap piece as the riving knife follows the scores made by cutters $m$ $m'$ and separates the stave. The knife $k'$ following after, dresses the outside of the bolt so as to finish the outside of the succeeding stave. This knife is double bitted and removes the surplus wood without tearing. As soon as the stave is separated, it falls into the space behind, the guide plate F' and is caught by a spring dog $q$ passing through longitudinal piece G. The motion of the carriage is then reversed, and the stave forced by this dog under spring roller $r$ to the double bitted stationary cutter $s$ which dresses the interior of the stave. The longitudinal piece G is concave and the cutter S convex.

Opposite to the plate H and like it connected with bars $p$ $p'$ is a plate H', and at the upper extremities of these bars, are attached two plates I I'. These plates have curved slots $t$ as shown in Fig. 2, which constitute the guides of shafts $u$ $u'$ of two systems of rotary cutters $v$ $v$. These cutter shafts $u$ $u'$ rest in boxes $x$, capable of vertical movement on rods $z$. The curve of slots $t$ is such as will give the necessary curve to the edges of the stave as it passes between the two systems of rotary cutters, the boxes $x$ moving upon the rods $z$ to permit the rise and fall of the cutters. The edges of the cutters are inclined so as to give the necessary bevel to the edge of the stave. After the finished stave has been delivered, the bolt is forced in against the guide plate E and the operation above described repeated. Motion is given the rotary cutters by bands $b'\ b''$ from pulley P.

Having described my invention and the operation thereof, what I claim, and desire to secure by Letters Patent, is—

1. The self adjusting bar E and cap piece D in combination with the knives $k\ k'$ substantially as and for the purposes set forth.

2. I also claim the combination of the expanding guide plates with the rotary cutters $v\ v$ arranged and operating as set forth.

3. I further claim the longitudinal piece G, spring dog $q$, pressure roller $r$, and stationary cutter S in combination with each other and the rotary cutters.

In testimony whereof, I have hereunto signed my name before two subscribing witnesses.

WM. ROBINSON.

Witnesses:
GEO. PATTEN,
JAS. D. CLARY.